(12) United States Patent
Banister et al.

(10) Patent No.: US 8,830,934 B2
(45) Date of Patent: Sep. 9, 2014

(54) CONFIGURABLE FILTER FOR MULTI-RADIO INTERFERENCE MITIGATION

(75) Inventors: Brian Clarke Banister, San Diego, CA (US); Jibing Wang, San Diego, CA (US); Ahmed K. Sadek, San Diego, CA (US); Tamer Adel Kadous, San Diego, CA (US); Pranav Dayal, San Diego, CA (US); Ashok Mantravadi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 12 days.

(21) Appl. No.: 13/314,686

(22) Filed: Dec. 8, 2011

(65) Prior Publication Data

US 2012/0307749 A1 Dec. 6, 2012

Related U.S. Application Data

(60) Provisional application No. 61/421,822, filed on Dec. 10, 2010, provisional application No. 61/432,171, filed on Jan. 12, 2011, provisional application No. 61/500,981, filed on Jun. 24, 2011.

(51) Int. Cl.
*H04W 4/00* (2009.01)
*H04B 1/04* (2006.01)
*H04W 16/14* (2009.01)

(52) U.S. Cl.
CPC ............. *H04B 1/0475* (2013.01); *H04W 16/14* (2013.01)
USPC ........................................................ 370/329

(58) Field of Classification Search
USPC ............... 370/311, 395.5, 339, 329; 375/341; 455/63.1, 63.3
See application file for complete search history.

(56) References Cited

U.S. PATENT DOCUMENTS 7,099,412 B2 * 8/2006 Coffey .......................... 375/341
7,499,420 B2   3/2009 Huh et al.
7,809,399 B2  10/2010 Lu et al.
7,826,459 B2 * 11/2010 Xhafa et al. ............... 370/395.5

(Continued)

FOREIGN PATENT DOCUMENTS

GB       2477649 A       8/2011
WO    2006085139 A2    8/2006

OTHER PUBLICATIONS

International Search Report and Written Opinion—PCT/US2011/064181—ISA/EPO—Jun. 13, 2012.

(Continued)

*Primary Examiner* — Mark Rinehart
*Assistant Examiner* — Gbemileke Onamuti
(74) *Attorney, Agent, or Firm* — Seyfarth Shaw LLP

(57) ABSTRACT

In a multi-radio device, a configurable filter may be placed on the transmit side of an aggressor radio to reduce interference to receive side performance of a victim radio. The filter may be adaptively configured based on performance of the victim radio. The configurable filter may be in the form of a notch filter. The depth and width of the notch filter may be configured. The filter may be used to create a virtual guard band between an Industrial Scientific and Medical (ISM) band and a cellular band by puncturing a physical uplink control channel (PUCCH) transmission nearest to the ISM band or reducing power on the nearest PUCCH transmission.

32 Claims, 14 Drawing Sheets

(56) References Cited

U.S. PATENT DOCUMENTS

| | | |
|---|---|---|
| 2008/0045152 A1* | 2/2008 | Boes .................... 455/63.1 |
| 2009/0225717 A1 | 9/2009 | Banerjea |
| 2009/0262785 A1 | 10/2009 | Wilhelmsson |
| 2010/0040178 A1 | 2/2010 | Sutton et al. |
| 2010/0091752 A1* | 4/2010 | Kemmochi et al. ........ 370/339 |
| 2010/0128689 A1 | 5/2010 | Yoon et al. |
| 2010/0142605 A1 | 6/2010 | Chamberlain |
| 2010/0189190 A1 | 7/2010 | Youtz et al. |
| 2010/0197235 A1* | 8/2010 | Wilhelmsson ............. 455/63.3 |
| 2010/0246463 A1* | 9/2010 | Papasakellariou et al. ... 370/311 |
| 2011/0007675 A1 | 1/2011 | Chiou et al. |
| 2011/0116490 A1 | 5/2011 | Wilhelmsson et al. |
| 2011/0205986 A1 | 8/2011 | Medapalli |

OTHER PUBLICATIONS

Partial International Search Report—PCT/US2011/064181—ISA/EPO—Apr. 24, 2012.

* cited by examiner

CONFIGURABLE FILTER FOR MULTI-RADIO INTERFERENCE MITIGATION

CROSS REFERENCE TO RELATED APPLICATIONS

This application claims the benefit of U.S. provisional patent application No. 61/421,822 filed Dec. 10, 2010, in the names of SADEK et al., U.S. provisional patent application No. 61/432,171 filed Jan. 12, 2011, in the names of BANISTER et al., and U.S. provisional patent application No. 61/500,981 filed Jun. 24, 2011, in the names of DAYAL et al., the disclosures of which are expressly incorporated by reference in their entireties.

TECHNICAL FIELD

The present description is related, generally, to multi-radio techniques and, more specifically, to coexistence techniques for multi-radio devices.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple out (MIMO) system.

Some conventional advanced devices include multiple radios for transmitting/receiving using different Radio Access Technologies (RATs). Examples of RATs include, e.g., Universal Mobile Telecommunications System (UMTS), Global System for Mobile Communications (GSM), cdma2000, WiMAX, WLAN (e.g., WiFi), Bluetooth, LTE, and the like.

An example mobile device includes an LTE User Equipment (UE), such as a fourth generation (4G) mobile phone. Such 4G phone may include various radios to provide a variety of functions for the user. For purposes of this example, the 4G phone includes an LTE radio for voice and data, an IEEE 802.11 (WiFi) radio, a Global Positioning System (GPS) radio, and a Bluetooth radio, where two of the above or all four may operate simultaneously. While the different radios provide useful functionalities for the phone, their inclusion in a single device gives rise to coexistence issues. Specifically, operation of one radio may in some cases interfere with operation of another radio through radiative, conductive, resource collision, and/or other interference mechanisms. Coexistence issues include such interference.

This is especially true for the LTE uplink channel, which is adjacent to the Industrial Scientific and Medical (ISM) band and may cause interference therewith It is noted that Bluetooth and some Wireless LAN (WLAN) channels fall within the ISM band. In some instances, a Bluetooth error rate can become unacceptable when LTE is active in some channels of Band 7 or even Band 40 for some Bluetooth channel conditions. Even though there is no significant degradation to LTE, simultaneous operation with Bluetooth can result in disruption in voice services terminating in a Bluetooth headset. Such disruption may be unacceptable to the consumer. A similar issue exists when LTE transmissions interfere with GPS. Currently, there is no mechanism that can solve this issue since LTE by itself does not experience any degradation With reference specifically to LTE, it is noted that a UE communicates with an evolved NodeB (eNB; e.g., a base station for a wireless communications network) to inform the eNB of interference seen by the UE on the downlink. Furthermore, the eNB may be able to estimate interference at the UE using a downlink error rate. In some instances, the eNB and the UE can cooperate to find a solution that reduces interference at the UE, even interference due to radios within the UE itself. However, in conventional LTE, the interference estimates regarding the downlink may not be adequate to comprehensively address interference.

In one instance, an LTE uplink signal interferes with a Bluetooth signal or WLAN signal. However, such interference is not reflected in the downlink measurement reports at the eNB. As a result, unilateral action on the part of the UE (e.g., moving the uplink signal to a different channel) may be thwarted by the eNB, which is not aware of the uplink coexistence issue and seeks to undo the unilateral action. For instance, even if the UE re-establishes the connection on a different frequency channel, the network can still handover the UE back to the original frequency channel that was corrupted by the in-device interference. This is a likely scenario because the desired signal strength on the corrupted channel may sometimes be higher be reflected in the measurement reports of the new channel based on Reference Signal Received Power (RSRP) to the eNB. Hence, a ping-pong effect of being transferred back and forth between the corrupted channel and the desired channel can happen if the eNB uses RSRP reports to make handover decisions.

Other unilateral action on the part of the UE, such as simply stopping uplink communications without coordination of the eNB may cause power loop malfunctions at the eNB. Additional issues that exist in conventional LTE include a general lack of ability on the part of the UE to suggest desired configurations as an alternative to configurations that have coexistence issues. For at least these reasons, uplink coexistence issues at the UE may remain unresolved for a long time period, degrading performance and efficiency for other radios of the UE.

SUMMARY

A method for wireless communication is offered. The method includes actively communicating on a first radio access technology (RAT). The method also includes selectively filtering transmissions from a second radio access technology (RAT) to attenuate in-band power on a selected frequency range. The filtering occurs at baseband.

An apparatus for wireless communication is offered. The apparatus includes means for actively communicating on a first radio access technology (RAT). The apparatus also includes means for selectively filtering transmissions from a second radio access technology (RAT) to attenuate in-band power on a selected frequency range. The filtering occurs at baseband.

A computer program product for wireless communication is offered. The computer program product includes a non-transitory computer-readable medium having non-transitory program code recorded thereon. The program code includes program code to actively communicate on a first radio access technology (RAT). The program code also includes program code to selectively filter transmissions from a second radio access technology (RAT) to attenuate in-band power on a selected frequency range. The filtering occurs at baseband.

An apparatus for wireless communication is offered. The apparatus includes a memory and a processor(s) coupled to the memory. The processor(s) is configured to actively communicate on a first radio access technology (RAT). The processor(s) is also configured to selectively filter transmissions from a second radio access technology (RAT) to attenuate in-band power on a selected frequency range. The filtering occurs at baseband.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
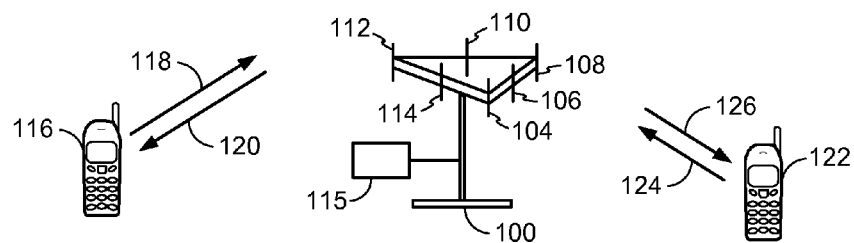
FIG. 1 illustrates a multiple access wireless communication system according to one aspect.

Various aspects of the disclosure provide techniques to mitigate coexistence issues in multi-radio devices, where significant in-device coexistence problems can exist between, e.g., the LTE and Industrial Scientific and Medical (ISM) bands (e.g., for BT/WLAN). As explained above, some coexistence issues persist because an eNB is not aware of interference on the UE side that is experienced by other radios. According to one aspect, the UE declares a Radio Link Failure (RLF) and autonomously accesses a new channel or Radio Access Technology (RAT) if there is a coexistence issue on the present channel. The UE can declare a RLF in some examples for the following reasons: 1) UE reception is affected by interference due to coexistence, and 2) the UE transmitter is causing disruptive interference to another radio. The UE then sends a message indicating the coexistence issue to the eNB while reestablishing connection in the new channel or RAT. The eNB becomes aware of the coexistence issue by virtue of having received the message.

The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network can implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3$^{rd}$ Generation Partnership Project" (3GPP). CDMA2000 is described in documents from an organization named "3$^{rd}$ Generation Partnership Project 2" (3GPP2). These various radio technologies and standards are known in the art. For clarity, certain aspects of the techniques are described below for LTE, and LTE terminology is used in portions of the description below.

Single carrier frequency division multiple access (SC-FDMA), which utilizes single carrier modulation and frequency domain equalization is a technique that can be utilized with various aspects described herein. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for an uplink multiple access scheme in 3GPP Long Term Evolution (LTE), or Evolved UTRA.

Referring to FIG. 1, a multiple access wireless communication system according to one aspect is illustrated. An evolved Node B 100 (eNB) includes a computer 115 that has processing resources and memory resources to manage the LTE communications by allocating resources and parameters, granting/denying requests from user equipment, and/or the like. The eNB 100 also has multiple antenna groups, one group including antenna 104 and antenna 106, another group including antenna 108 and antenna 110, and an additional group including antenna 112 and antenna 114. In FIG. 1, only two antennas are shown for each antenna group, however, more or fewer antennas can be utilized for each antenna group. A User Equipment (UE) 116 (also referred to as an Access Terminal (AT)) is in communication with antennas 112 and 114, while antennas 112 and 114 transmit information to the UE 116 over a downlink (DL) 120 and receive information from the UE 116 over an uplink (UL) 118. The UE 122 is in communication with antennas 106 and 108, while antennas 106 and 108 transmit information to the UE 122 over a downlink (DL) 126 and receive information from the UE 122 over an uplink 124. In a frequency division duplex (FDD) system, communication links 118, 120, 124 and 126 can use different frequencies for communication. For example, the downlink 120 can use a different frequency than used by the uplink 118.

Each group of antennas and/or the area in which they are designed to communicate is often referred to as a sector of the eNB. In this aspect, respective antenna groups are designed to communicate to UEs in a sector of the areas covered by the eNB 100.

In communication over the downlinks 120 and 126, the transmitting antennas of the eNB 100 utilize beamforming to improve the signal-to-noise ratio of the uplinks for the different UEs 116 and 122. Also, an eNB using beamforming to transmit to UEs scattered randomly through its coverage causes less interference to UEs in neighboring cells than a UE transmitting through a single antenna to all its UEs.

An eNB can be a fixed station used for communicating with the terminals and can also be referred to as an access point, base station, or some other terminology. A UE can also be called an access terminal, a wireless communication device, terminal, or some other terminology.

Figure 2:
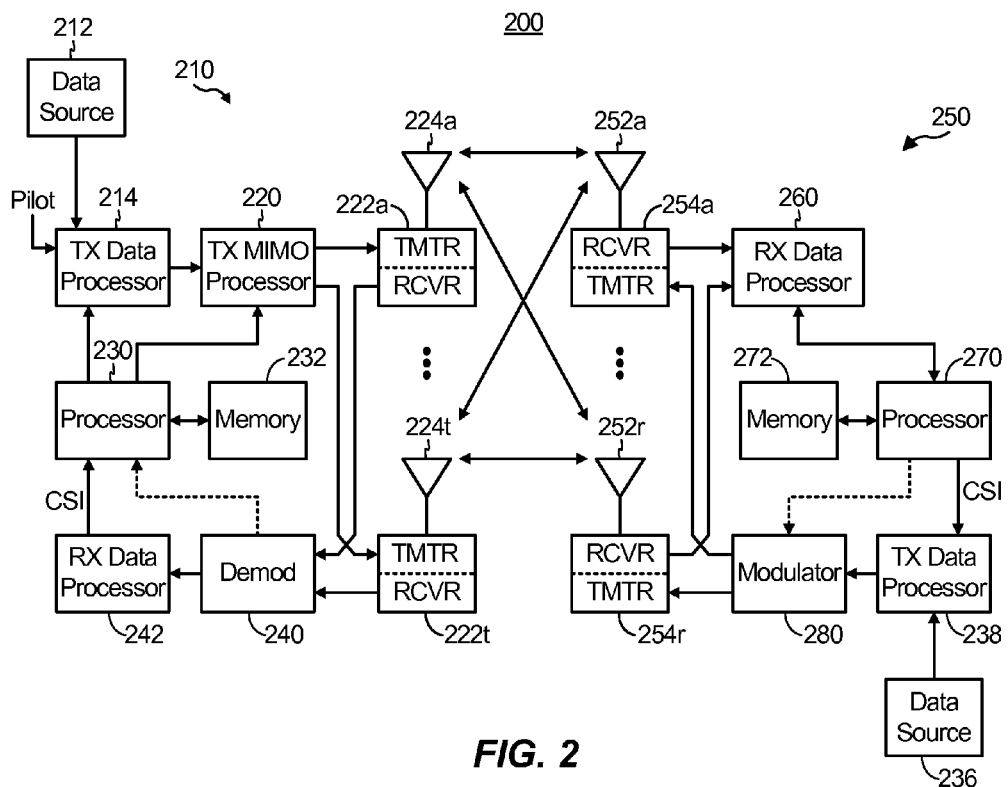
FIG. 2 is a block diagram of a communication system according to one aspect.

FIG. 2 is a block diagram of an aspect of a transmitter system 210 (also known as an eNB) and a receiver system 250 (also known as a UE) in a MIMO system 200. In some instances, both a UE and an eNB each have a transceiver that includes a transmitter system and a receiver system. At the transmitter system 210, traffic data for a number of data streams is provided from a data source 212 to a transmit (TX) data processor 214.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, wherein $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the uplink and downlink transmissions are on the same frequency region so that the reciprocity principle allows the estimation of the downlink channel from the uplink channel. This enables the eNB to extract transmit beamforming gain on the downlink when multiple antennas are available at the eNB.

In an aspect, each data stream is transmitted over a respective transmit antenna. The TX data processor 214 formats, codes, and interleaves the traffic data for each data stream based on a particular coding scheme selected for that data stream to provide coded data.

The coded data for each data stream can be multiplexed with pilot data using OFDM techniques. The pilot data is a known data pattern processed in a known manner and can be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream can be determined by instructions performed by a processor 230 operating with a memory 232.

The modulation symbols for respective data streams are then provided to a TX MIMO processor 220, which can further process the modulation symbols (e.g., for OFDM). The TX MIMO processor 220 then provides $N_T$ modulation symbol streams to $N_T$ transmitters (TMTR) 222a through 222t. In certain aspects, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from the transmitters 222a through 222t are then transmitted from $N_T$ antennas 224a through 224t, respectively.

At a receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_R$ "detected" symbol streams. The RX data processor 260 then demodulates, deinterleaves, and decodes each detected symbol stream to recover the traffic data for the data stream. The processing by the RX data processor 260 is complementary to the processing performed by the TX MIMO processor 220 and the TX data processor 214 at the transmitter system 210.

A processor 270 (operating with a memory 272) periodically determines which pre-coding matrix to use (discussed below). The processor 270 formulates an uplink message having a matrix index portion and a rank value portion.

The uplink message can include various types of information regarding the communication link and/or the received data stream. The uplink message is then processed by a TX data processor 238, which also receives traffic data for a number of data streams from a data source 236, modulated by a modulator 280, conditioned by transmitters 254a through 254r, and transmitted back to the transmitter system 210.

At the transmitter system 210, the modulated signals from the receiver system 250 are received by antennas 224, conditioned by receivers 222, demodulated by a demodulator 240, and processed by an RX data processor 242 to extract the uplink message transmitted by the receiver system 250. The processor 230 then determines which pre-coding matrix to use for determining the beamforming weights, then processes the extracted message.

Figure 3:
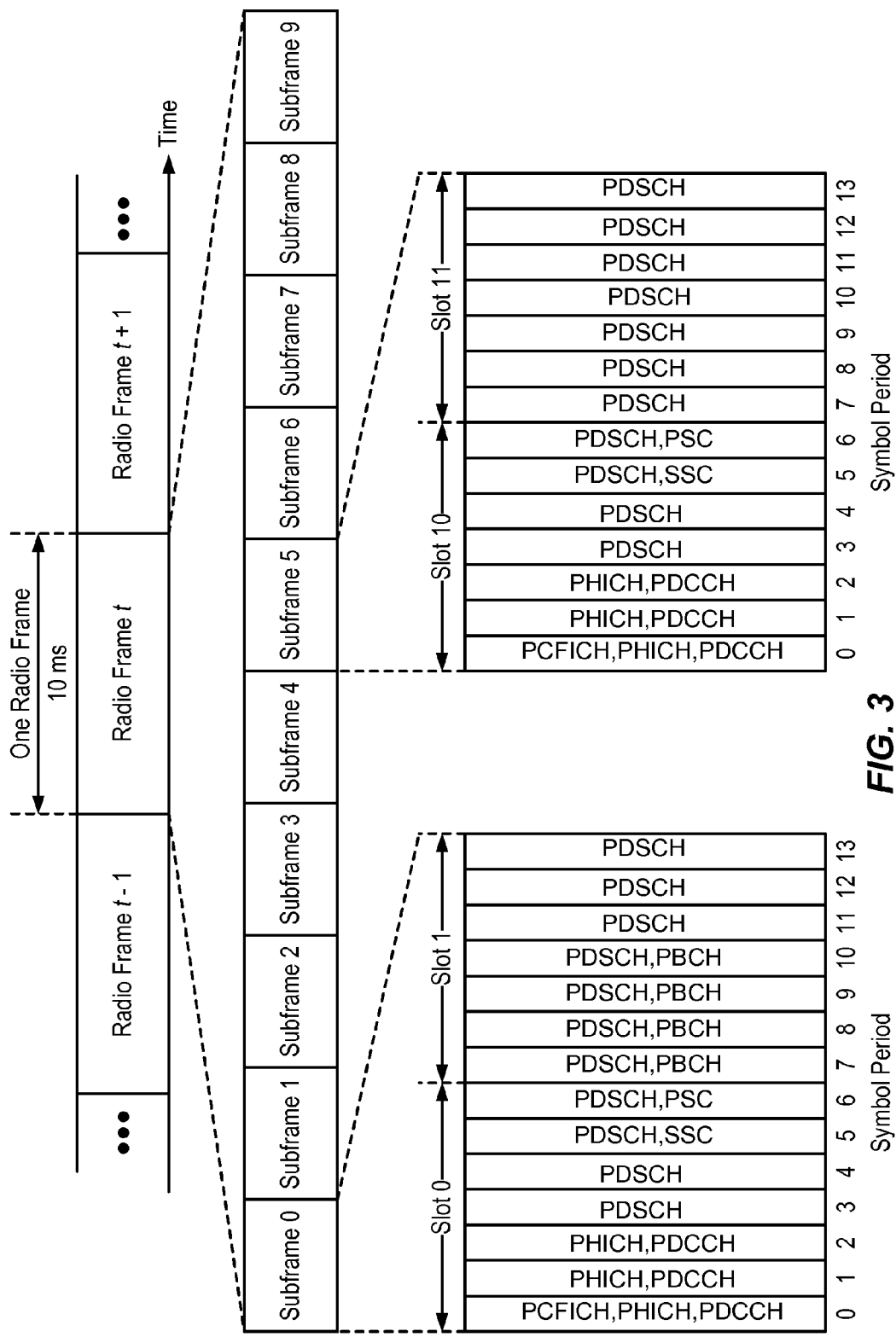
FIG. 3 illustrates an exemplary frame structure in downlink Long Term Evolution (LTE) communications.

FIG. 3 is a block diagram conceptually illustrating an exemplary frame structure in downlink Long Term Evolution (LTE) communications. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 3) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a Primary Synchronization Signal (PSS) and a Secondary Synchronization Signal (SSS) for each cell in the eNB. The PSS and SSS may be sent in symbol periods 6 and 5, respectively, in each of subframes 0 and 5 of each radio frame with the normal cyclic prefix, as shown in FIG. 3. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Cell-specific Reference Signal (CRS) for each cell in the eNB. The CRS may be sent in symbols 0, 1, and 4 of each slot in case of the normal cyclic prefix, and in symbols 0, 1, and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNB may send a Physical Control Format Indicator Channel (PCFICH) in the first symbol period of each subframe, as seen in FIG. 3. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 3, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 3. The PHICH may carry information to support Hybrid Automatic Repeat Request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
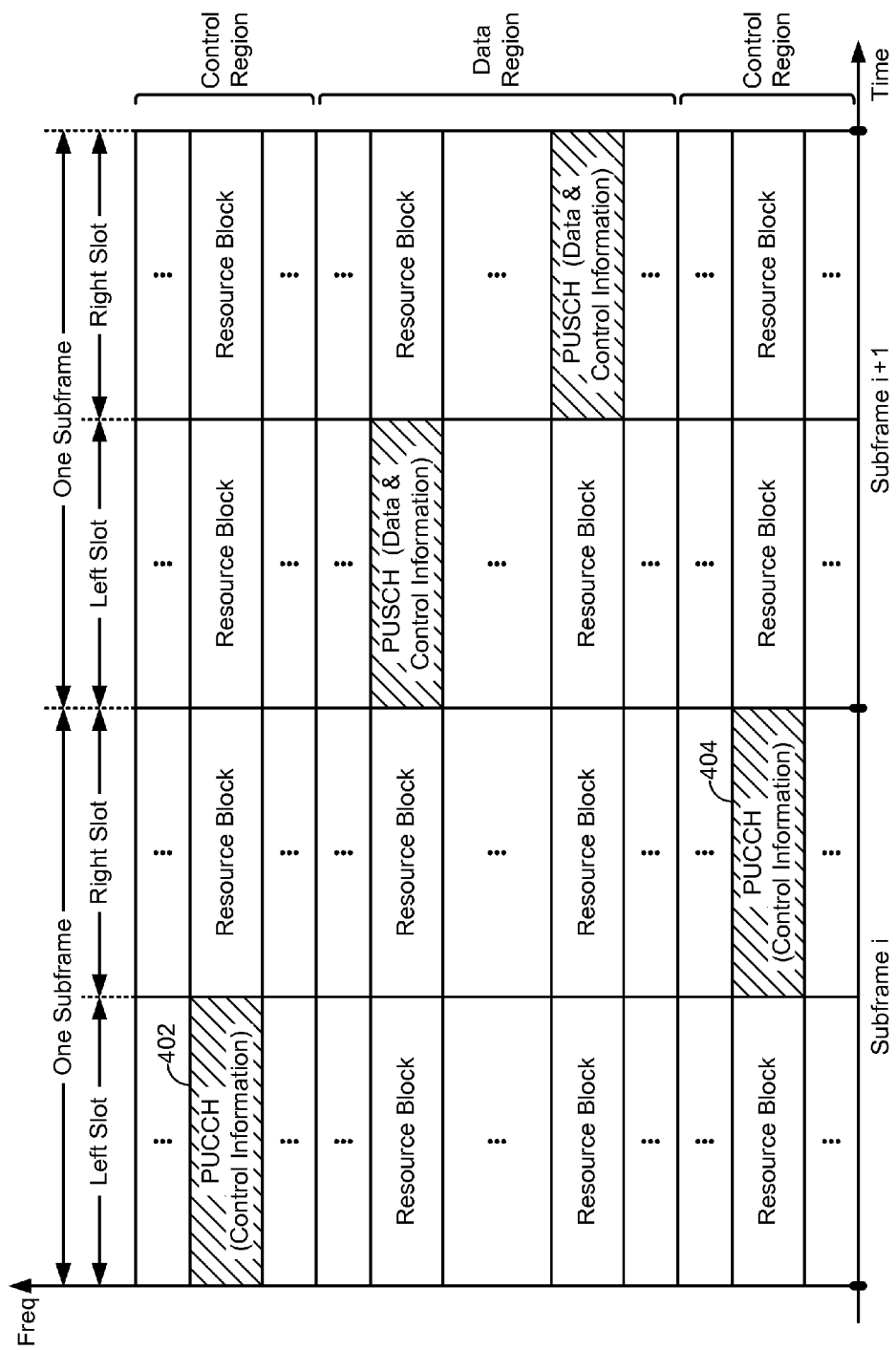
FIG. 4 is a block diagram conceptually illustrating an exemplary frame structure in uplink Long Term Evolution (LTE) communications.

FIG. 4 is a block diagram conceptually illustrating an exemplary frame structure in uplink Long Term Evolution (LTE) communications. The available Resource Blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 4 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNodeB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 4.

The PSS, SSS, CRS, PBCH, PUCCH and PUSCH in LTE are described in 3GPP TS 36.211, entitled "Evolved Universal Terrestrial Radio Access (E-UTRA); Physical Channels and Modulation," which is publicly available.

In an aspect, described herein are systems and methods for providing support within a wireless communication environment, such as a 3GPP LTE environment or the like, to facilitate multi-radio coexistence solutions.

Figure 5:
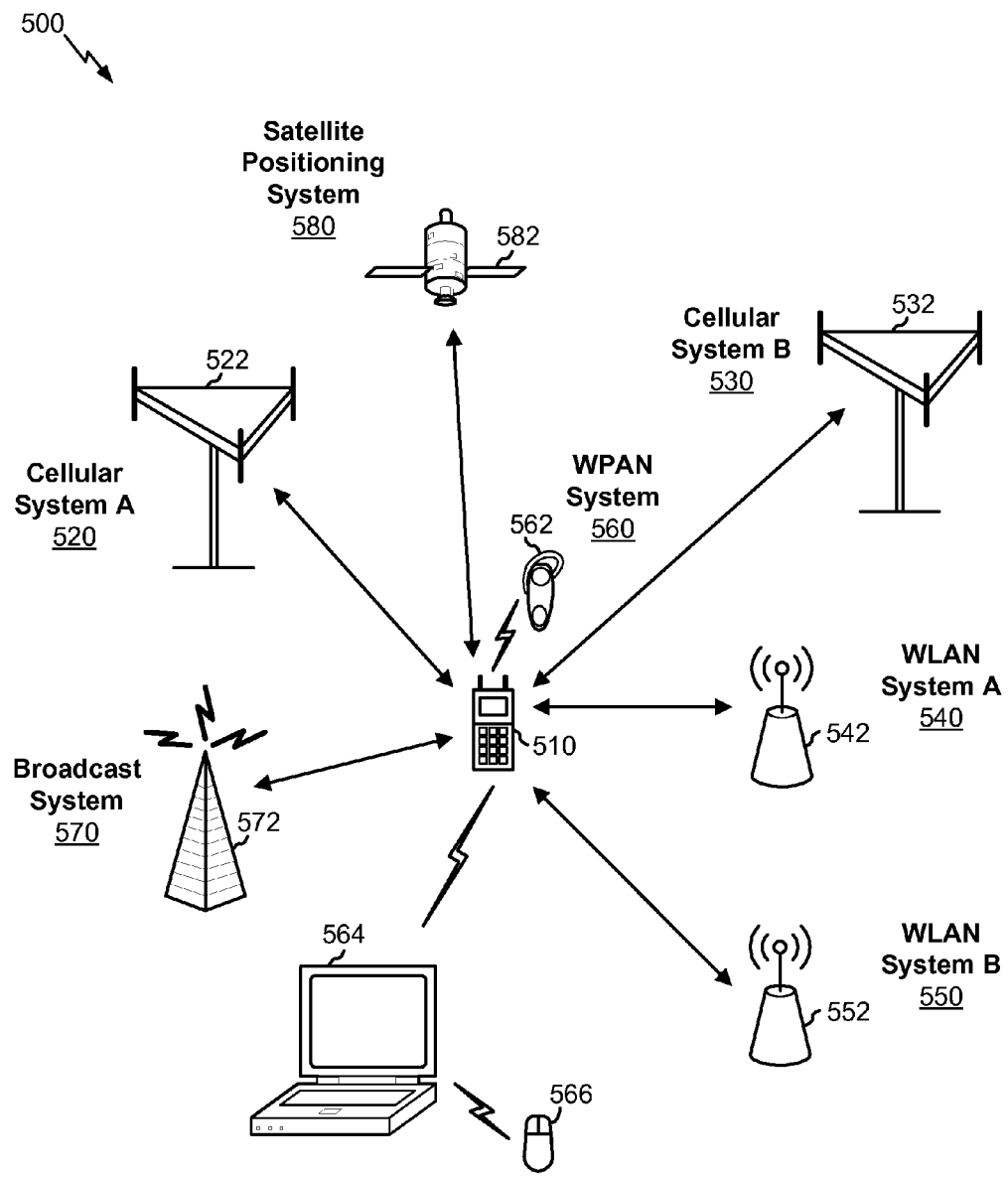
FIG. 5 illustrates an example wireless communication environment.

Referring now to FIG. 5, illustrated is an example wireless communication environment 500 in which various aspects described herein can function. The wireless communication environment 500 can include a wireless device 510, which can be capable of communicating with multiple communication systems. These systems can include, for example, one or more cellular systems 520 and/or 530, one or more WLAN systems 540 and/or 550, one or more wireless personal area network (WPAN) systems 560, one or more broadcast systems 570, one or more satellite positioning systems 580, other systems not shown in FIG. 5, or any combination thereof. It should be appreciated that in the following description the terms "network" and "system" are often used interchangeably.

The cellular systems 520 and 530 can each be a CDMA, TDMA, FDMA, OFDMA, Single Carrier FDMA (SC-FDMA), or other suitable system. A CDMA system can implement a radio technology such as Universal Terrestrial Radio Access (UTRA), cdma2000, etc. UTRA includes Wideband CDMA (WCDMA) and other variants of CDMA. Moreover, cdma2000 covers IS-2000 (CDMA2000 1X), IS-95 and IS-856 (HRPD) standards. A TDMA system can implement a radio technology such as Global System for Mobile Communications (GSM), Digital Advanced Mobile Phone System (D-AMPS), etc. An OFDMA system can implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3$^{rd}$ Generation Partnership Project" (3GPP). cdma2000 and UMB are described in documents from an organization named "3$^{rd}$ Generation Partnership Project 2" (3GPP2). In an aspect, the cellular system 520 can include a number of base stations 522, which can support bi-directional communication for wireless devices within their coverage. Similarly, the cellular system 530 can include a number of base stations 532 that can support bi-directional communication for wireless devices within their coverage.

WLAN systems 540 and 550 can respectively implement radio technologies such as IEEE 802.11 (WiFi), Hiperlan, etc. The WLAN system 540 can include one or more access points 542 that can support bi-directional communication. Similarly, the WLAN system 550 can include one or more access points 552 that can support bi-directional communication. The WPAN system 560 can implement a radio technology such as Bluetooth (BT), IEEE 802.15, etc. Further, the WPAN system 560 can support bi-directional communication for various devices such as wireless device 510, a headset 562, a computer 564, a mouse 566, or the like.

The broadcast system 570 can be a television (TV) broadcast system, a frequency modulation (FM) broadcast system, a digital broadcast system, etc. A digital broadcast system can implement a radio technology such as MediaFLO™, Digital Video Broadcasting for Handhelds (DVB-H), Integrated Services Digital Broadcasting for Terrestrial Television Broadcasting (ISDB-T), or the like. Further, the broadcast system 570 can include one or more broadcast stations 572 that can support one-way communication.

The satellite positioning system 580 can be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, and/or any other suitable system. Further, the satellite positioning system 580 can include a number of satellites 582 that transmit signals for position determination.

In an aspect, the wireless device 510 can be stationary or mobile and can also be referred to as a user equipment (UE), a mobile station, a mobile equipment, a terminal, an access terminal, a subscriber unit, a station, etc. The wireless device 510 can be cellular phone, a personal digital assistance (PDA), a wireless modem, a handheld device, a laptop computer, a cordless phone, a wireless local loop (WLL) station, etc. In addition, a wireless device 510 can engage in two-way communication with the cellular system 520 and/or 530, the WLAN system 540 and/or 550, devices with the WPAN system 560, and/or any other suitable systems(s) and/or devices (s). The wireless device 510 can additionally or alternatively receive signals from the broadcast system 570 and/or satellite positioning system 580. In general, it can be appreciated that the wireless device 510 can communicate with any number of systems at any given moment. Also, the wireless device 510 may experience coexistence issues among various ones of its constituent radio devices that operate at the same time. Accordingly, device 510 includes a coexistence manager (CxM, not shown) that has a functional module to detect and mitigate coexistence issues, as explained further below.

Figure 6:
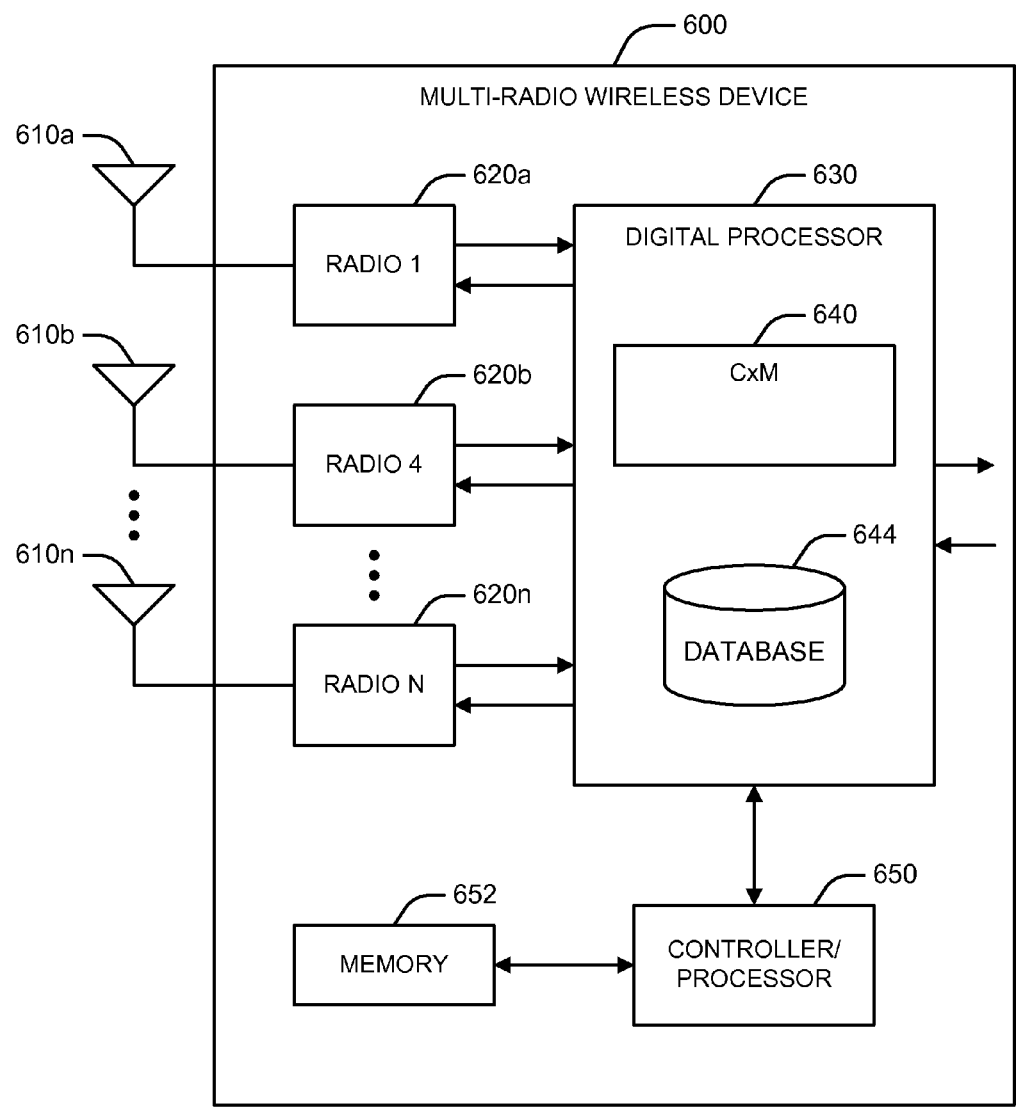
FIG. 6 is a block diagram of an example design for a multi-radio wireless device.

Turning next to FIG. 6, a block diagram is provided that illustrates an example design for a multi-radio wireless device 600 and may be used as an implementation of the radio 510 of FIG. 5. As FIG. 6 illustrates, the wireless device 600 can include N radios 620a through 620n, which can be coupled to N antennas 610a through 610n, respectively, where N can be any integer value. It should be appreciated, however, that respective radios 620 can be coupled to any number of antennas 610 and that multiple radios 620 can also share a given antenna 610.

In general, a radio 620 can be a unit that radiates or emits energy in an electromagnetic spectrum, receives energy in an electromagnetic spectrum, or generates energy that propagates via conductive means. By way of example, a radio 620 can be a unit that transmits a signal to a system or a device or a unit that receives signals from a system or device. Accordingly, it can be appreciated that a radio 620 can be utilized to support wireless communication. In another example, a radio 620 can also be a unit (e.g., a screen on a computer, a circuit board, etc.) that emits noise, which can impact the performance of other radios. Accordingly, it can be further appreciated that a radio 620 can also be a unit that emits noise and interference without supporting wireless communication.

In an aspect, respective radios 620 can support communication with one or more systems. Multiple radios 620 can additionally or alternatively be used for a given system, e.g., to transmit or receive on different frequency bands (e.g., cellular and PCS bands).

In another aspect, a digital processor 630 can be coupled to radios 620a through 620n and can perform various functions, such as processing for data being transmitted or received via the radios 620. The processing for each radio 620 can be dependent on the radio technology supported by that radio and can include encryption, encoding, modulation, etc., for a transmitter; demodulation, decoding, decryption, etc., for a receiver, or the like. In one example, the digital processor 630 can include a C×M 640 that can control operation of the radios 620 in order to improve the performance of the wireless device 600 as generally described herein. The C×M 640 can have access to a database 644, which can store information used to control the operation of the radios 620. As explained further below, the C×M 640 can be adapted for a variety of techniques to decrease interference between the radios. In one example, the C×M 640 requests a measurement gap pattern or DRX cycle that allows an ISM radio to communicate during periods of LTE inactivity.

For simplicity, digital processor 630 is shown in FIG. 6 as a single processor. However, it should be appreciated that the digital processor 630 can include any number of processors, controllers, memories, etc. In one example, a controller/processor 650 can direct the operation of various units within the wireless device 600. Additionally or alternatively, a memory 652 can store program codes and data for the wireless device 600. The digital processor 630, controller/processor 650, and memory 652 can be implemented on one or more integrated circuits (ICs), application specific integrated circuits (ASICs), etc. By way of specific, non-limiting example, the digital processor 630 can be implemented on a Mobile Station Modem (MSM) ASIC.

Figure 7:
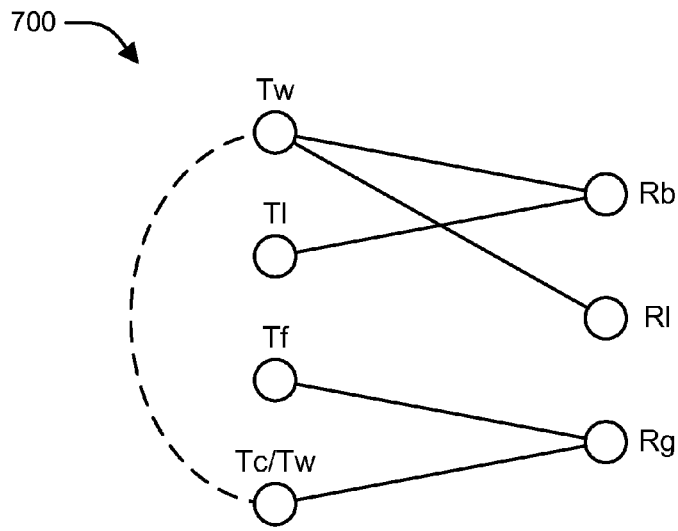
FIG. 7 is graph showing respective potential collisions between seven example radios in a given decision period.

In an aspect, the C×M 640 can manage operation of respective radios 620 utilized by wireless device 600 in order to avoid interference and/or other performance degradation associated with collisions between respective radios 620. C×M 640 may perform one or more processes, such as those illustrated in FIG. 11. By way of further illustration, a graph 700 in FIG. 7 represents respective potential collisions between seven example radios in a given decision period. In the example shown in graph 700, the seven radios include a WLAN transmitter (Tw), an LTE transmitter (Tl), an FM transmitter (Tf), a GSM/WCDMA transmitter (Tc/Tw), an LTE receiver (Rl), a Bluetooth receiver (Rb), and a GPS receiver (Rg). The four transmitters are represented by four nodes on the left side of the graph 700. The four receivers are represented by three nodes on the right side of the graph 700.

A potential collision between a transmitter and a receiver is represented on the graph 700 by a branch connecting the node for the transmitter and the node for the receiver. Accordingly, in the example shown in the graph 700, collisions may exist between (1) the WLAN transmitter (Tw) and the Bluetooth receiver (Rb); (2) the LTE transmitter (Tl) and the Bluetooth receiver (Rb); (3) the WLAN transmitter (Tw) and the LTE receiver (Rl); (4) the FM transmitter (Tf) and the GPS receiver (Rg); (5) a WLAN transmitter (Tw), a GSM/WCDMA transmitter (Tc/Tw), and a GPS receiver (Rg).

Figure 8:
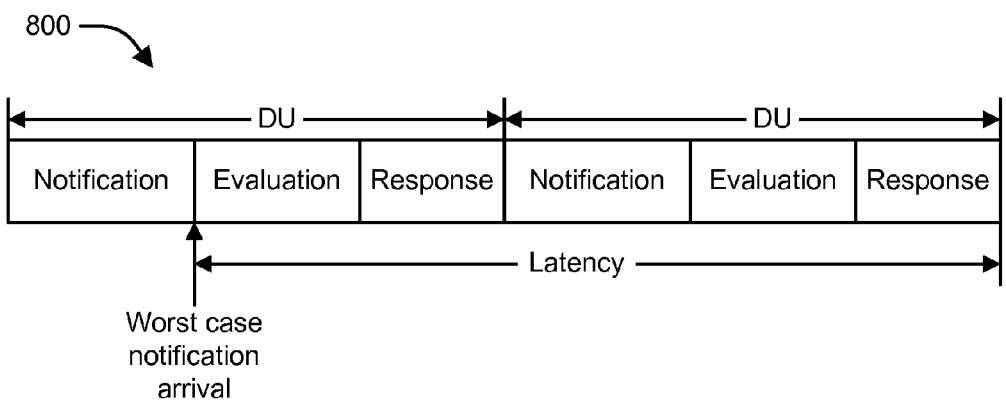
FIG. 8 is a diagram showing operation of an example Coexistence Manager (CxM) over time.

In one aspect, an example C×M 640 can operate in time in a manner such as that shown by diagram 800 in FIG. 8. As diagram 800 illustrates, a timeline for C×M operation can be divided into Decision Units (DUs), which can be any suitable uniform or non-uniform length (e.g., 100 µs) where notifications are processed, and a response phase (e.g., 20 µs) where commands are provided to various radios 620 and/or other operations are performed based on actions taken in the evaluation phase. In one example, the timeline shown in the diagram 800 can have a latency parameter defined by a worst case operation of the timeline, e.g., the timing of a response in the case that a notification is obtained from a given radio immediately following termination of the notification phase in a given DU.

Figure 9:
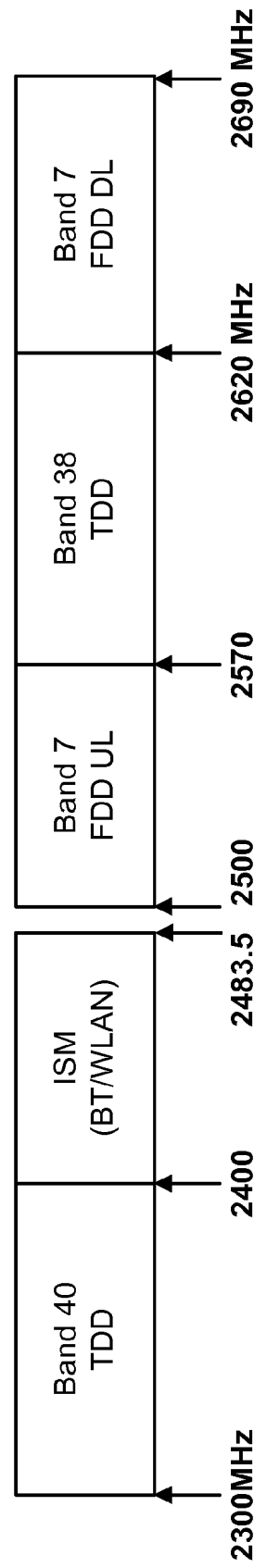
FIG. 9 is a block diagram illustrating adjacent frequency bands.

As shown in FIG. 9, Long Term Evolution (LTE) in band 7 (for frequency division duplex (FDD) uplink), band 40 (for time division duplex (TDD) communication), and band 38 (for TDD downlink) is adjacent to the 2.4 GHz Industrial Scientific and Medical (ISM) band used by Bluetooth (BT) and Wireless Local Area Network (WLAN) technologies. Frequency planning for these bands is such that there is limited or no guard band permitting traditional filtering solutions to avoid interference at adjacent frequencies. For example, a 20 MHz guard band exists between ISM and band 7, but no guard band exists between ISM and band 40.

To be compliant with appropriate standards, communication devices operating over a particular band are to be operable over the entire specified frequency range. For example, in order to be LTE compliant, a mobile station/user equipment should be able to communicate across the entirety of both band 40 (2300-2400 MHz) and band 7 (2500-2570 MHz) as defined by the 3rd Generation Partnership Project (3GPP). Without a sufficient guard band, devices employ filters that overlap into other bands causing band interference. Because band 40 filters are 100 MHz wide to cover the entire band, the rollover from those filters crosses over into the ISM band causing interference. Similarly, ISM devices that use the entirety of the ISM band (e.g., from 2401 through approximately 2480 MHz) will employ filters that rollover into the neighboring band 40 and band 7 and may cause interference.

In-device coexistence problems can exist with respect to a UE between resources such as, for example, LTE and ISM bands (e.g., for Bluetooth/WLAN). In current LTE implementations, any interference issues to LTE are reflected in the downlink measurements (e.g., Reference Signal Received Quality (RSRQ) metrics, etc.) reported by a UE and/or the downlink error rate which the eNB can use to make inter-frequency or inter-RAT handoff decisions to, e.g., move LTE to a channel or RAT with no coexistence issues. However, it can be appreciated that these existing techniques will not work if, for example, the LTE uplink is causing interference to Bluetooth/WLAN but the LTE downlink does not see any interference from Bluetooth/WLAN. More particularly, even if the UE autonomously moves itself to another channel on the uplink, the eNB can in some cases handover the UE back to the problematic channel for load balancing purposes. In any case, it can be appreciated that existing techniques do not facilitate use of the bandwidth of the problematic channel in the most efficient way.

Figure 10:
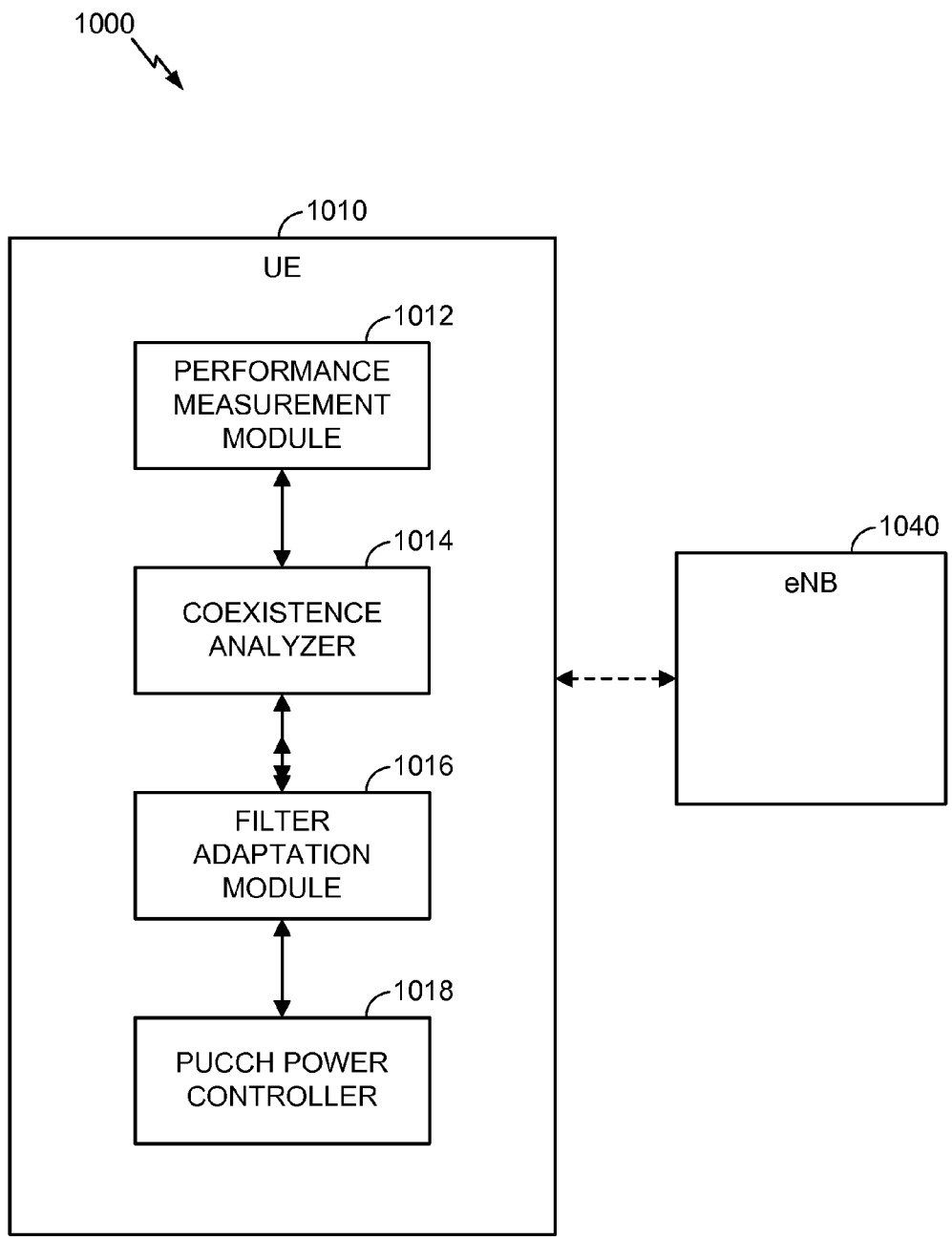
FIG. 10 is a block diagram of a system for providing support within a wireless communication environment for multi-radio coexistence management according to one aspect of the present disclosure.

Turning now to FIG. 10, a block diagram of a system 1000 for providing support within a wireless communication environment for multi-radio coexistence management is illustrated. In an aspect, the system 1000 can include one or more UEs 1010 and/or eNBs 1040, which can engage in uplink and/or downlink communications, and/or any other suitable communication with each other and/or any other entities in the system 1000. In one example, the UE 1010 and/or eNB 1040 can be operable to communicate using a variety resources, including frequency channels and sub-bands, some of which can potentially be colliding with other radio resources (e.g., a broadband radio such as an LTE modem). Thus, the UE 1010 can utilize various techniques for managing coexistence between multiple radios utilized by the UE 1010, as generally described herein.

To mitigate at least the above shortcomings, the UE 1010 can utilize respective features described herein and illustrated by the system 1000 to facilitate support for multi-radio coexistence within the UE 1010. For example, a performance measurement module 1012, a coexistence analyzer 1014, a filter adaptation module 1016, and a PUCCH power controller 1018 may be provided. The performance measurement module 1012 measures performance of operating radios in a multi-radio device. The coexistence analyzer 1014 analyzes potential interference/coexistence issues among the operating radios. The filter adaptation module 1016 adapts a filter for operation based at least in part on the performance of the operating radios and potentially on the PUCCH power controller 1018. The various modules 1012-1018 may, in some examples, be implemented as part of a coexistence manager such as the C×M 640 of FIG. 6. The various modules 1012-1018 and others may be configured to implement the aspects discussed herein.

Configurable Filter for Multi-Radio Interference Mitigation

Multiple radios may interfere with each other causing severely degraded performance. In particular, multi-radio coexistence is an issue if potentially interfering radios are on the same device. For example, for coexistence between a Long Term Evolution (LTE) radio and a code division multiple access (CDMA) 1× radio, or between an LTE radio and an Industrial Scientific and Medical (ISM) radio (such as Bluetooth (BT) or wireless local area network (WLAN)), LTE transmissions (Tx) may cause interference with ISM reception (Rx). In particular, with Bluetooth/WLAN operation in band 7 or band 40, LTE transmission can cause significant interference to a Bluetooth or WLAN receiver, particularly in frequency ranges near the border of the ISM band as illustrated in FIG. 9.

Figure 11:
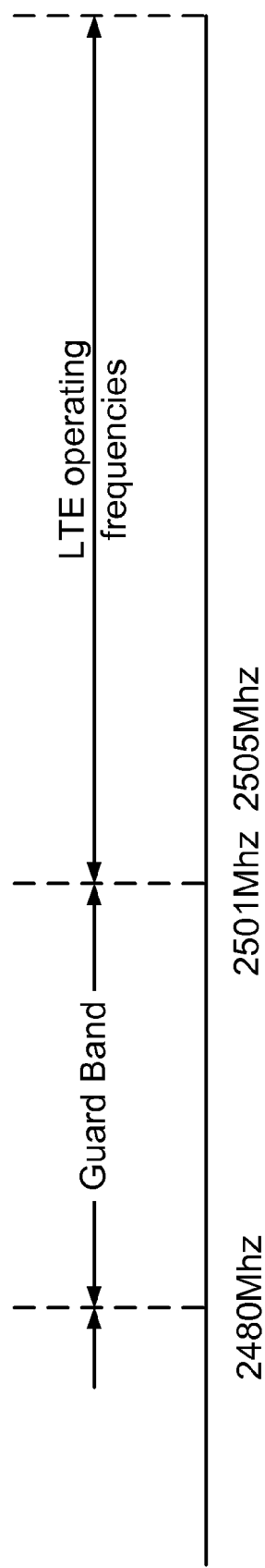
FIG. 11 is a block diagram illustrating adjacent frequency bands.

The amount of interference caused by an aggressor (transmitter) may depend on the frequency allocations. One example frequency allocation, illustrated in FIG. 11, is 20 MHz LTE at band 7 with a center frequency of 2510 MHz. When a LTE uplink (UL) frequency resource block (RB) is at the lower edge of the 20 MHz (e.g., the lower 5 MHz of the band, i.e. 2501 MHz to 2505 MHz), the LTE uplink block may cause significant interference with Bluetooth, which operates between 2401 and 2480 MHz. Although there is a 20 MHz guard band between the ISM band and band 7, LTE transmission (Tx) can still cause interference to BT reception (Rx), especially if LTE is operating near the lower edge, for example in the 2501 to 2505 MHz range. If the LTE uplink resource block is at the other end of the 20 MHz channel, however, there may be less interference.

Offered is a configurable baseband transmission (Tx) filter that can adaptively limit the amount of impact caused by the aggressor (transmitter) to the victim (receiver).

The configurable transmission filter is configured on the baseband. A baseband filter has several advantages over a radio-frequency (RF) filter. A baseband filter is easier to adaptively configure based on various factors, has better accuracy, and does not suffer from the same insertion loss as an RF filter. The baseband filter may be adaptively configured based at least in part on the performance of a victim radio access technology (RAT), such as Bluetooth. The victim RAT operating frequency and/or performance quality may determine the configuration of the baseband filter. The Bluetooth performance quality may take into account the quality of voice service experienced by a user. The Bluetooth performance may be determined by certain metrics such as Bluetooth packet error rate and Bluetooth packet delay. A baseline measurement of the victim RAT performance may be taken when the aggressor RAT (such as LTE) is inactive. This baseline measurement may be used for comparison purposes when determining performance of the victim RAT (such as Bluetooth) in the face of potential interference from the aggressor RAT.

Figure 12:
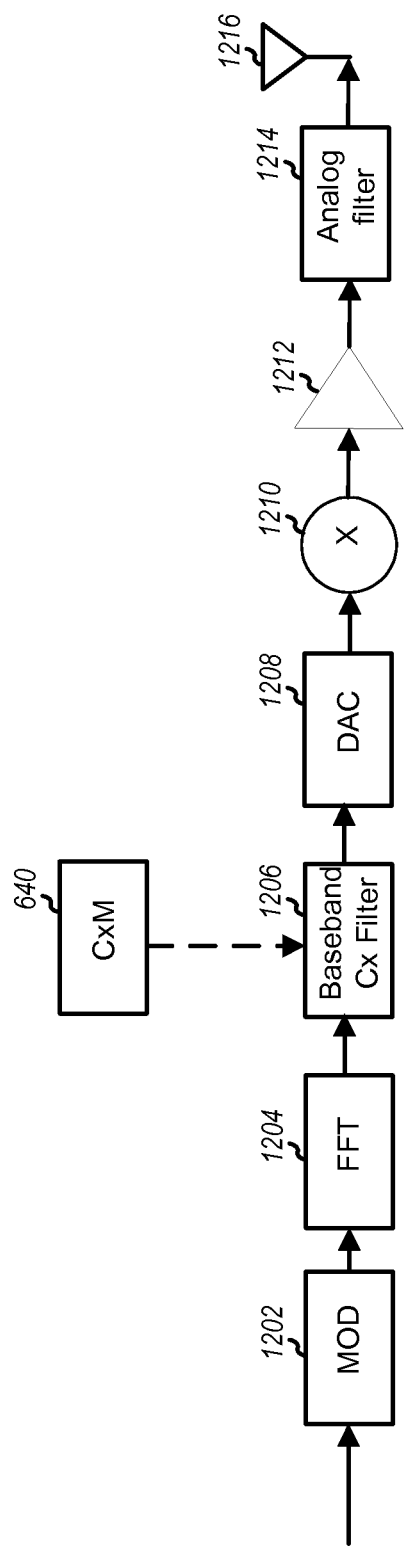
FIG. 12 illustrates a configurable transmission filter according to one aspect of the present disclosure.

The configurable transmission filter may be implemented as shown in FIG. 12. FIG. 12 illustrates a partial transmit chain according to one aspect of the present disclosure. A signal is sent to a modulator 1202. Once the signal is modulated, if the modulation takes place in the frequency domain the modulated signal is sent to a Fast Fourier Transform (FFT) block 1204. The transformed signal is sent to the adaptively configurable baseband coexistence filter 1206. The filter 1206 may be implemented according to the aspects disclosed herein. The filter 1206 receives input from a coexistence manager (C×M) 640 which may control the adaptive configuration of the filter 1206. The C×M may receive input from RATs operating within the mobile device. Thus the C×M may adaptively configure the filter 1206 to operate, for example, based at least in part on the performance of a victim RAT. Once filtered, the signal is processed by a digital-to-analog converter (DAC) 1208 and mixer 1210. The power of the signal is adjusted by a power adapter 1212 and then filtered by an analog filter 1214 before being sent to an antenna 1216 for transmission.

Figure 13:
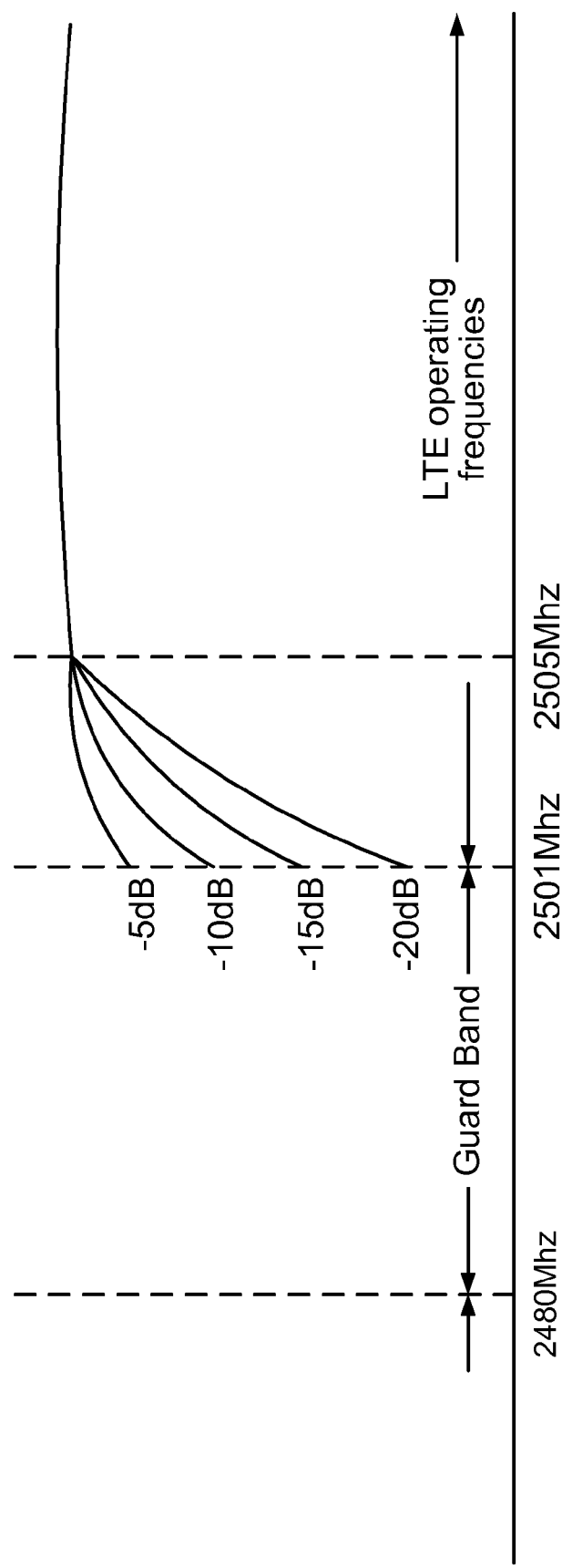
FIG. 13 illustrates a configurable transmission filter according to one aspect of the present disclosure.

To control the amount of interference caused by LTE to Bluetooth, a programmable transmission digital filter may be applied at the LTE side. The filter, applied to the LTE system, attenuates the in-band power on those frequencies that are close to the Bluetooth channel, for example, 2501-2505 MHz. FIG. 13 shows such a configurable filter applied near the edge between the ISM band and band 7. As shown in FIG. 13, the configurable filter attenuates LTE transmissions from 2501 to 2505 MHz with different attenuation levels. Attenuation may be greater at frequencies closer to the ISM band. The set of frequencies to attenuate are also programmable and may depend on the coexistence scenarios. For example, the frequency range to attenuate may depend on temperature. The shape of the transmission filter may also depend on a receive filter at the victim side, as the victim will see the composite response of the victim's receive filter and the aggressor's transmission filter.

The transmission filter helps a victim radio at the cost of certain performance degradation at the aggressor in the filtered frequency range (i.e., the filter may cause distortion in 2501-2505 MHz because of limits to transmit power). In the provided example, the LTE physical uplink control channel (PUCCH) decoding performance may see some loss when the transmission filter is applied as the PUCCH is typically transmitted in the lower spectrum range. Further details on configuring the filter regarding the PUCCH are discussed below. When the aggressor (e.g., LTE) does not cause significant interference to the victim (e.g., Bluetooth), the transmission filter may not be used. When the aggressor does significantly interfere with the victim, to achieve a desirable performance tradeoff between aggressor and victim, the configurable filter may be employed adaptively. For example, the amount of attenuation should help the victim but should not hurt the aggressor unnecessarily in mitigating the cross-radio interference. If performance of an aggressor radio is material, a base station (eNB) may react with power control as well as channel selective scheduling (i.e., scheduling the UE to transmit in non-attenuated frequencies) to improve aggressor transmit performance.

The configuration of the transmission filter may depend on factors such as a victim received signal strength indicator (RSSI)/interference level, a victim performance metric (such as packet error rate), and/or aggressor transmit power. In the case of an LTE aggressor, the transmission filter is only applied when LTE is identified to be the cause of the strong interference seen by the victim. This may avoid unnecessary performance effects on the LTE radio. In addition, outer control loops could be run to set the parameters to configure the transmission filter adaptively. For example, when Bluetooth RSSI is high, then LTE may not have any additional rejection for those frequencies. When Bluetooth RSSI is low and LTE is the cause of the interference to Bluetooth, then the filter parameters may be chosen adaptively such that a Bluetooth packet error rate is at certain acceptable level (for example 1%).

The configurable transmission filter may also be implemented as a notch filter at the border of the ISM band and band 7 (or elsewhere). Such a notch filter may be configured to selectively attenuate the edge subcarrier frequencies used by an LTE transmitter that are not rejected sufficiently by a receive filter of an ISM radio, such as Bluetooth. The configurable filter may selectively filter the LTE transmitter in an LTE frequency range proximate to the frequency range of an ISM radio. A signal filtered by the notch filter would appear to a base station as a variation in the channel. The parameters of the notch filter may be chosen so as to not cause unnecessary rejection in the remaining LTE subcarriers (i.e., the non-interfering subcarriers). An adaptive method for choosing multiple parameters of the notch filter is presented that attempts to achieve improved performance for LTE while achieving a desired level of Bluetooth performance. Implementation of a notch filter as described (which reduces the power of specific subcarriers by varying amounts) may result in a performance improvement over other schemes such as adaptive LTE power backoff (which reduces the power of all subcarriers by the same amount) or single parameter adaptation of notch filter.

Figure 14:
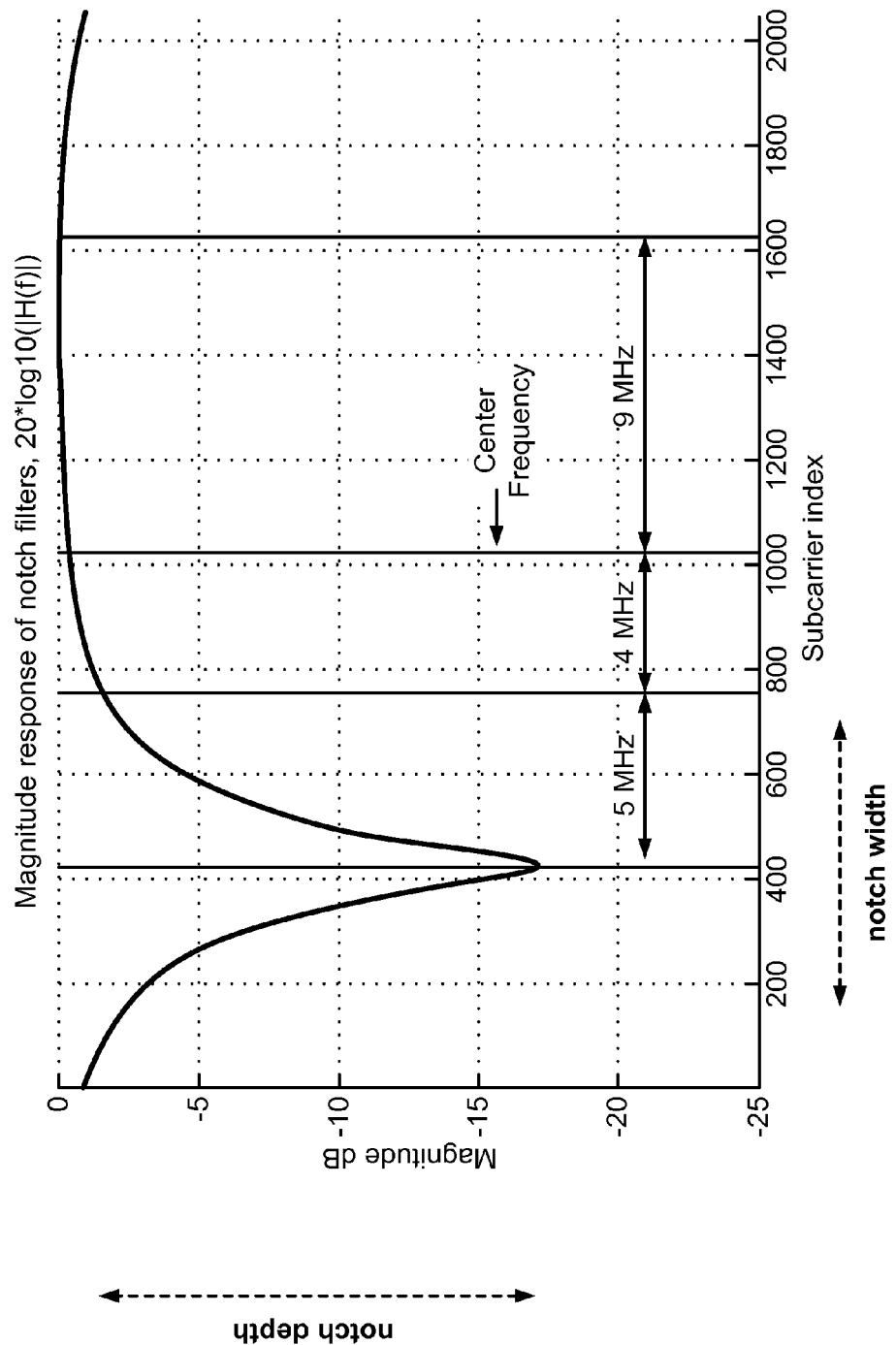
FIG. 14 illustrates a configurable transmission filter according to one aspect of the present disclosure.

A complex notch filter of the form shown in FIG. 14 may be used. The horizontal axis of the notch graph shows the subcarrier index (i.e., frequency) of the LTE transmit signal. The vertical axis of the notch graph shows the magnitude of the notch filter. The notch filter reduces the power of LTE transmitted signals in the notched region. Signals at particular frequencies included in the notch depth are reduced in strength corresponding to the depth of the notch. The filter may be centered at the LTE band edge because interference to the ISM is strongest there. This will focus cancellation of LTE signals near the ISM band, without significant effect on signals farther from the band edge.

The notch function may be described by the following equation:

$$H_{notch} = \frac{1+|\alpha|\beta}{1+|\alpha|} \frac{1-\alpha z^{-1}}{1-\alpha\beta z^{-1}}$$ Equation 1 where
$\alpha = depth * e^{j*Fs}$
$\beta = 1 - width$
$0 < |\alpha|$
$|\beta| < 1$ and Fs is the location of the notch filter along the subcarrier index. The depth and width parameters control the filter shape. These three parameters are chosen to reduce interference while maintaining desired radio performance.

The notch may be adjusted by altering the values of Fs, width, and depth. Adjusting the depth will adjust the strength reduction to the signals on subcarriers included in the notch. A greater depth results in greater strength reduction. Adjusting the width will adjust which subcarriers are included in the notch. A greater width results in a larger number of subcarriers impacted by the notch filter. Too wide of a filter may not be desirable due to reduction of signal strength to subcarriers farther away from the band edge. Adjusting the Fs adjusts the location of the notch and which subcarrier the notch is centered on. It may be desirable to maintain the notch filter near the band edge to reduce cross-band interference.

Adjusting one parameter at a time is a single parameter adaptation. Adjusting two parameters at a time (2D filter adaptation) may be more desirable to more finely control the filter. To control the filter to achieve desired Bluetooth operation, a coexistence manager (C×M) may apply the following update equation periodically (e.g., every 100 ms) based on feedback of a Bluetooth error rate $e_m$ and a target error rate $e_t$ (for example at =3%):

$$\Delta(n) = \Delta(n-1) + \mu(e_m - e_t)$$ Equation 2 where $\mu$ is a scale factor, $\Delta(n)$ is a factor at time n indicating how close the Bluetooth error rate is to the target error rate, and $\Delta(n-1)$ is the previous value of the factor $\Delta$.

In other solutions, $\Delta(n)$ may be used differently. For a power backoff implementation, $\Delta(n)$ may be used as a backoff from max power. This backoff may be applied to all subcarriers and consequently leads to unnecessary rejection of LTE signals further away from band edge. For single parameter filter adaptation, $\Delta(n)$ selects the depth while the width is fixed. This option controls the depth of the notch filter but the fixed width shape provides less flexibility on the attenuation of all subcarriers. For 2-D filter adaptation, $\Delta(n)$ may be used to select both depth and width. This option provides the most flexibility in rejecting a reduced or minimum amount of LTE signal to lead to acceptable Bluetooth performance (for example using a smaller width and larger depth, which may avoid impacting certain LTE subcarriers).

Various pre-set depths and widths may be defined to ease control of the notch shape. For example, ten values of depth (depth indices) may be defined [0, 0.1, 0.2, . . . 0.9] and nine values of width (width indices) may be defined [0.1, 0.2, . . . 0.9]. This provides for 90 different width/depth combinations and thus 90 different notch filter shapes. One of these combinations may be selected based on the feedback from Bluetooth as described by $\Delta(n)$.

To track radio performance, the following equations and loops may be used. $\epsilon$ may be used to represent how rapidly the Bluetooth packet error rate changes relative to the target packet error rate. Let $\epsilon(n) = \Delta(n) - \Delta(n-1) = \mu(e_m - e_t)$. A large value of $\epsilon(n)$ implies that the Bluetooth error has suddenly become much higher than the target error. $\sigma$ may be used to track this change in error rate over several measurements. Let $\sigma(n) = \sigma(n-1) + \epsilon(n)$. This is a sum of recent error differences. A large negative value of $\sigma(n)$ implies that the Bluetooth error is well below the target error for a long time. This indicates Bluetooth performance above target and may indicate unnecessary rejection of LTE signals. If $\epsilon(n)$ is above a threshold ($\epsilon(n)$>thr_1), increment the width index by 1 (go to the next highest width setting) and reset $\sigma(n) = 0$. This condition attempts to quickly improve Bluetooth performance by widening the LTE notch filter if Bluetooth error increases. If $\epsilon(n)$ is not above a threshold, but if $\sigma(n)$ is less than a threshold ($\sigma(n)$<thr_2), decrement the width index by 1 and reset $\sigma(n) = 0$. This condition improves LTE throughput by reducing the notch filter width if Bluetooth performance is consistently better than expected. The depth index may be chosen to correspond to $\Delta(n)$, perhaps with additional processing. Optionally if any of the above threshold conditions is met, filter depth may be chosen to the highest value of 0.9 to be conservative while changing widths.

The proposed 2D filter adaptation has significant performance benefits. The performance of the equations may be further improved by adjusting the thresholds to account for different scheduling scenarios. LTE scheduling information may be used by the C×M to select the thresholds (thr_1 and thr_2). For example, if the LTE signal is closer to the band edge, a certain set of thresholds may be used, whereas if the LTE signal is further from the band edge, a different set of thresholds may be used. In improved interference scenarios such as sub-band scheduling and low duty cycle, more gain may be achieved with smaller width configurations.

The notch filter may be employed in other bands such as Band 13, Band 14, etc. that may interfere with Global Positioning System (GPS) communications. Depending on the configurations of a control channel such as the physical uplink control channel (PUCCH) or the PUCCH payload, the C×M may move or disable the notch. For example, if the PUCCH payload is large, the notch may be disabled. Or the notch may only be turned off during a PUCCH portion of a subframe. The notch may be moved to attenuate PUCCH for a particular user equipment (which may be communicating in a later resource block of the band).

The transmission filter may be further configured to protect PUCCH transmissions. Referring back to FIG. 4, the PUCCH 402, 404 is an uplink control channel in LTE communications that carries control signaling information, such as, but not limited to ACK/NACK (acknowledgement/negative acknowledgment) and CQI (channel quality indications). The PUCCH may be a source of interference from LTE in band 7 to communications in the ISM band because the PUCCH occupies a narrow band (one resource block (RB), which is 180 KHz) transmitted at the two edges of the uplink frequency band. The PUCCH is transmitted at both edges because the PUCCH is designed to utilize frequency diversity by transmitting the same information at both band edges. Each LTE uplink subframe has a duration of 1 millisecond. During the first 0.5 millisecond of the subframe (left slot), the PUCCH 402 occupies one resource block located at one edge of the uplink channel. In the second half of the same subframe (right slot), the PUCCH 404 occupies the resource block at an opposite edge of the uplink channel.

The transmitted information may encounter independent fading due to the frequency separation that is equal to the uplink channel bandwidth. Transmitting the information twice increases the PUCCH decoding reliability. When the PUCCH is transmitted in the resource block at the edge nearest (or closest) to the ISM band, if the ISM filter attenuation is not strong enough, the ISM radio may de-sense due to blocking or receiver non-linearity may occur.

In one aspect of this disclosure, the configurable transmission filter is applied as a virtual guard band between the PUCCH and the ISM band. The 'filtering' is implemented by denying/puncturing PUCCH transmission in a slot of a subframe having a frequency assignment closest to the ISM band. The PUCCH may be transmitted only in the slot of a subframe having a frequency assignment furthest away from the ISM band. For example, in each PUCCH subframe, the UE performs DTX (discontinuous transmission) during the 0.5 ms (slot) that corresponds to the resource block at the channel edge closest to the ISM band. The PUCCH is transmitted in a manner similar to normal operation during the 0.5 ms (slot) in which the resource block is located at the uplink channel edge furthest away from the ISM band. Denying the PUCCH transmission in one edge of the uplink channel increases the guard band between the PUCCH transmission and the ISM band. Because the information carried on the PUCCH may be decoded from one resource block, the eNodeB can decode the PUCCH information carried in the slot of the subframe transmitted on the resource block furthest from the edge of the ISM frequency bandwidth.

In one aspect, the puncturing does not occur when the PUCCH carries CQI or exceeds a predetermined bit length. In this case, an ISM filter may attenuate PUCCH transmission, reducing the LTE interference into the ISM band. In another aspect, the puncturing does not occur when ISM communications are not present.

Another aspect of the disclosure relates to 'filtering' by controlling the power level of the PUCCH transmissions. In one configuration, the UE transmits the single PUCCH (at the further edge) at a higher power to compensate for any loss of the frequency diversity in transmitting the PUCCH on only one edge. Alternately, the PUCCH power control loop may react naturally and boost the UE power. Another configuration includes using lower power for one half of the PUCCH transmission (rather than DTX), followed by a higher power for the second half of the PUCCH transmission. Such power control may be adjusted dynamically. The adjustment may be based on performance metrics obtained from the ISM radio. For example, a level of interference, packet error rate, throughput loss, or other performance metric that reflects LTE interference to the ISM radio could be considered. In one configuration, the power level is not altered when the PUCCH carries CQI or exceeds a predetermined bit length. In another configuration, the power level is not altered when ISM communications are not present.

Another aspect of the present disclosure includes a filter to shape the power. In this aspect, the PUCCH is transmitted at full power at both edges. A digital filter shapes the power spectral density of the PUCCH transmissions by attenuating the signal when the PUCCH is transmitted at the band edge closest to the ISM band while passing the signal with no attenuation when the PUCCH is transmitted at the band edge furthest from the ISM band. The shape of the filter could be adapted based on feedback from the ISM radio that reflects performance of the ISM radio. In one aspect, the filtering does not occur when the PUCCH carries CQI or exceeds a predetermined bit length. In another aspect, the filtering does not occur when ISM communications are not present.

Figure 15:
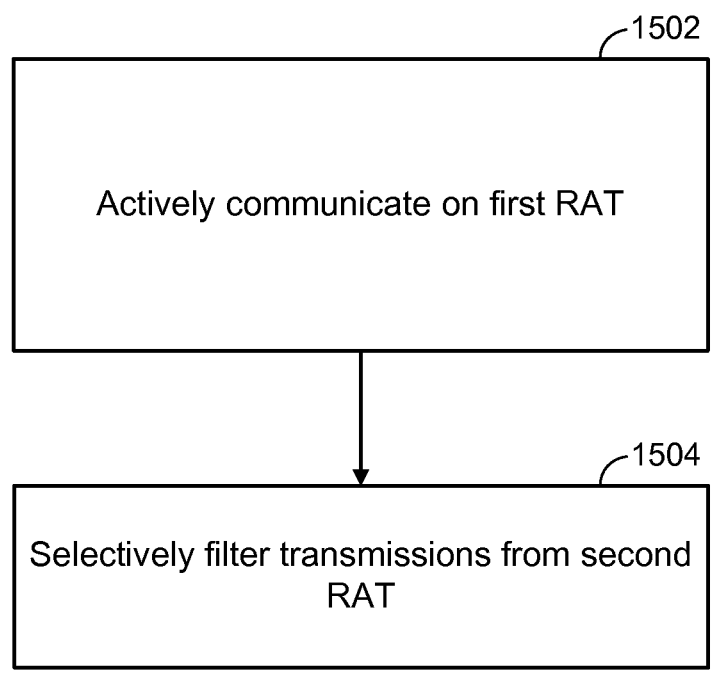
FIG. 15 is a block diagram illustrating a method for managing coexistence according to one aspect of the present disclosure.

As shown in FIG. 15, as shown in block 1502, a mobile device may actively communicating on a first RAT. As shown in block 1504, the mobile device may selectively filter transmissions from a second RAT to attenuate in-band power on a selected frequency range. The filtering occurs at baseband.

Figure 16:
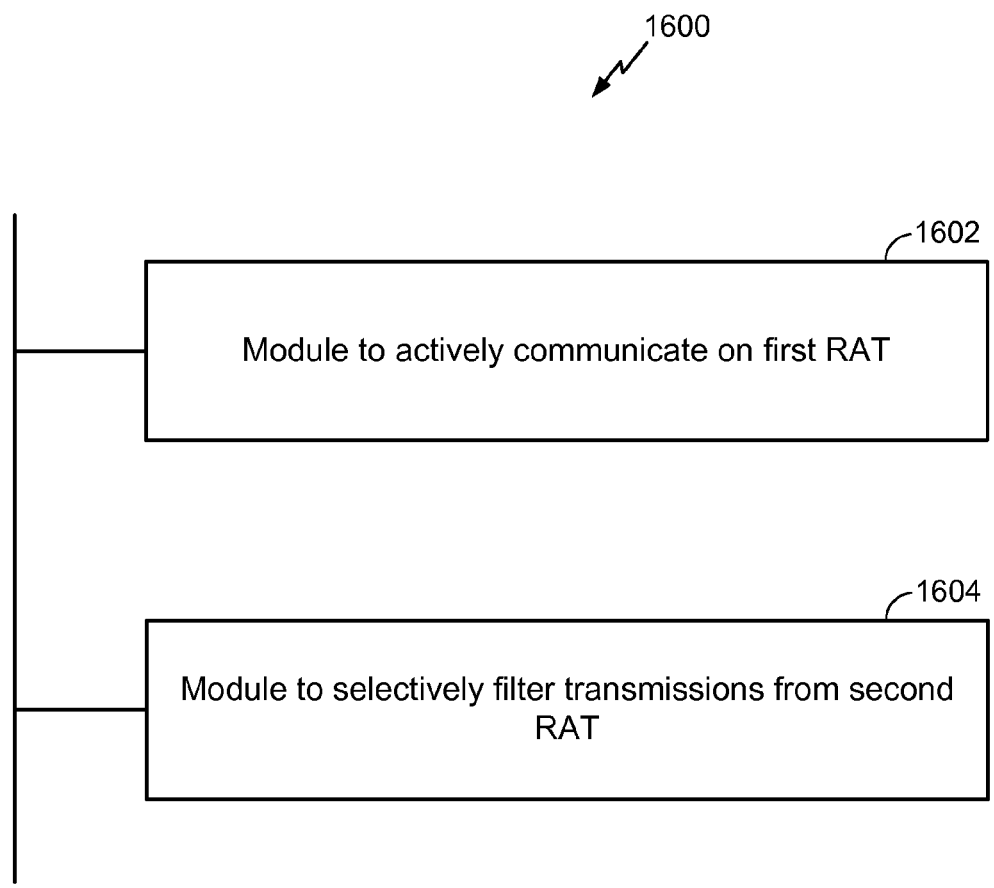
FIG. 16 is a block diagram illustrating components for managing coexistence according to one aspect of the present disclosure.

FIG. 16 shows a design of an apparatus 1600 for a user equipment, such as the user equipment 250. The apparatus 1600 includes a module 1602 for actively communicating on a first RAT. The apparatus 1600 also includes a module 1604 for selectively filtering transmissions from a second RAT to attenuate in-band power on a selected frequency range. The filtering occurs at baseband. The modules in FIG. 16 may be processors, electronics devices, hardware devices, electronics components, logical circuits, memories, software codes, firmware codes, etc., or any combination thereof.

In one configuration, a user equipment 250 is configured for wireless communication including means for actively communicating on a first RAT and means for selectively filtering transmission from a second RAT. In one aspect, the above means may be a coexistence manager 640, baseband filter 1206, module 1602, module 1604, filter adaptation module 1016, PUCCH power controller 1018, receiver/transmitter 254, and/or processor 270. In another aspect, the aforementioned means may be a module or any apparatus configured to perform the functions recited by the aforementioned means.

The examples above describe aspects implemented in an LTE system. However, the scope of the disclosure is not so limited. Various aspects may be adapted for use with other communication systems, such as those that employ any of a variety of communication protocols including, but not limited to, CDMA systems, TDMA systems, FDMA systems, and OFDMA systems.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method of wireless communication, comprising:
    actively receiving on a first radio access technology (RAT); and
    actively transmitting on a second radio access technology (RAT) while selectively filtering the transmissions from the second RAT to attenuate in-band power on a selected frequency range to reduce interference to receptions of the first RAT,
    wherein:
        the receiving, the filtering and the transmitting are performed in a same wireless communication device, the filtering reducing interference to the receptions of the first RAT at the device,
        the filtering occurs at baseband,
        the selected frequency range of the second RAT is proximate to a frequency range of the first RAT and is attenuated by varying amounts, and
        the amount of attenuation applied to the selected frequency range of the second RAT is greater at frequencies closer to the frequency range of the first RAT.

2. The method of claim 1 in which the first RAT is Bluetooth or wireless local area network (WLAN) and the second RAT is Long Term Evolution (LTE).

3. The method of claim 1 in which the selectively filtering is based at least in part on a quality of service of the first RAT.

4. The method of claim 3 in which the first RAT is Bluetooth and the quality of service is determined by a packet error rate.

5. The method of claim 3 in which the first RAT is Bluetooth and the quality of service is determined by a packet delay.

6. The method of claim 3 in which the selectively filtering is based at least in part on a comparison of the quality of service of the first RAT during operation of the second RAT and the quality of service of the first RAT when the second RAT is not operating.

7. The method of claim 1 in which the selectively filtering comprises adjusting a frequency range of the second RAT to be attenuated.

8. The method of claim 1 in which the selectively filtering comprises adjusting a shape of a configurable filter based at least in part on an ability of a receive filter of the first RAT to reject interference from transmissions by the second RAT in the selected frequency range.

9. The method of claim 8 in which adjusting the shape of the configurable filter is further based on reducing attenuation of frequencies of the second RAT outside of the selected frequency range.

10. The method of claim 1 in which the selectively filtering comprises adaptively adjusting a width and a depth of a notch filter to adjust performance of the first RAT toward a target performance.

11. The method of claim 1 in which the selectively filtering is based at least in part on a performance of a physical uplink control channel.

12. The method of claim 1 in which the selectively filtering comprises altering a first physical uplink control channel (PUCCH) transmission in a slot of a subframe having a frequency assignment closest to a frequency band of the first RAT.

13. The method of claim 12, in which the altering comprises puncturing the first PUCCH transmission.

14. The method of claim 12, in which the altering comprises adjusting a power level of the first PUCCH transmission.

15. The method of claim 13, in which the puncturing comprises performing discontinuous transmission during a time period corresponding to the first PUCCH transmission.

16. An apparatus for wireless communication, comprising:
means for actively receiving on a first radio access technology (RAT); and
means for selectively filtering transmissions of the apparatus from a second radio access technology (RAT) to attenuate in-band power on a selected frequency range by varying amounts to reduce interference to receptions of the first RAT at the apparatus, the amount of attenuation being greater at frequencies closer to the frequency range of the first RAT, the filtering occurring at baseband, and the selected frequency range of the second RAT being proximate to a frequency range of the first RAT.

17. A computer program product for wireless communication comprising:
a non-transitory computer-readable medium having non-transitory program code recorded thereon, the program code comprising:
program code to actively receive on a first radio access technology (RAT); and
program code to actively transmit on a second radio access technology (RAT), from a same wireless communication device that actively receives on the first RAT, while selectively filtering the transmissions from the second RAT to attenuate in-band power on a selected frequency range to reduce interference to receptions of the first RAT at the device, the filtering occurring at baseband, the selected frequency range of the second RAT being proximate to a frequency range of the first RAT and being attenuated by varying amounts, the amount of attenuation being greater at frequencies closer to the frequency range of the first RAT.

18. An apparatus for wireless communication comprising:
a memory; and
at least one processor coupled to the memory, the at least one processor being configured:
to actively receive on a first radio access technology (RAT); and
to actively transmit on a second radio access technology (RAT) while selectively filtering the transmissions from the second RAT to attenuate in-band power on a selected frequency range to reduce interference to receptions of the first RAT at the apparatus, the filtering occurring at baseband, the selected frequency range of the second RAT being proximate to a frequency range of the first RAT and being attenuated by varying amounts, the amount of attenuation being greater at frequencies closer to the frequency range of the first RAT.

19. The apparatus of claim 18 in which the first RAT is Bluetooth or wireless local area network (WLAN) and the second RAT is Long Term Evolution (LTE).

20. The apparatus of claim 18 in which the at least one processor is configured to selectively filter based at least in part on a quality of service of the first RAT.

21. The apparatus of claim 20 in which the first RAT is Bluetooth and the quality of service is determined by a packet error rate.

22. The apparatus of claim 20 in which the first RAT is Bluetooth and the quality of service is determined by a packet delay.

23. The apparatus of claim 20 in which the at least one processor is configured to selectively filter based at least in part on a comparison of the quality of service of the first RAT during operation of the second RAT and the quality of service of the first RAT when the second RAT is not operating.

24. The apparatus of claim 18 in which the at least one processor is configured to selectively filter by adjusting a frequency range of the second RAT to be attenuated.

25. The apparatus of claim 18 in which the at least one processor is configured to selectively filter by adjusting a shape of a configurable filter based at least in part on an ability of a receive filter of the first RAT to reject interference from the second RAT in the selected frequency range.

26. The apparatus of claim 25 in which adjusting the shape of the configurable filter is further based on reducing attenuation of frequencies of the second RAT outside of the selected frequency range.

27. The apparatus of claim 18 in which the at least one processor is configured to selectively filter by adaptively adjusting a width and a depth of a notch filter to adjust performance of the first RAT toward a target performance.

28. The apparatus of claim 18 in which the at least one processor is configured to selectively filter based at least in part on a performance of a physical uplink control channel.

29. The apparatus of claim 18 in which the at least one processor is configured to selectively filter by altering a first physical uplink control channel (PUCCH) transmission in a slot of a subframe having a frequency assignment closest to a frequency band of the first RAT.

30. The apparatus of claim 29, in which the altering comprises puncturing the first PUCCH transmission.

31. The apparatus of claim 29, in which the altering comprises adjusting a power level of the first PUCCH transmission.

32. The apparatus of claim 30, in which the puncturing comprises performing discontinuous transmission during a time period corresponding to the first PUCCH transmission.

* * * * *